(12) United States Patent
Glejbol

(10) Patent No.: US 6,742,813 B1
(45) Date of Patent: Jun. 1, 2004

(54) METHOD OF SECURING REINFORCEMENT WIRES TO AN END TERMINATION OF A PIPELINE OR A CABLE, AN END TERMINATION, AND USES OF THE METHOD AND THE END TERMINATION

(75) Inventor: Kristian Glejbol, Glostrup (DK)

(73) Assignee: NKT Flexibles I/S, Brondby (DK)

( * ) Notice: Subject to any disclaimer, the term of this patent is extended or adjusted under 35 U.S.C. 154(b) by 0 days.

(21) Appl. No.: 10/031,959
(22) PCT Filed: Jun. 30, 2000
(86) PCT No.: PCT/DK00/00353
§ 371 (c)(1), (2), (4) Date: Apr. 26, 2002
(87) PCT Pub. No.: WO01/07818
PCT Pub. Date: Feb. 1, 2001

(30) Foreign Application Priority Data

Jul. 23, 1999  (DK) .................................... 1999 01032

(51) Int. Cl.$^7$ ................................................ F16L 33/00
(52) U.S. Cl. ........................... 285/222.1; 285/222.2; 285/222.3; 285/222.4; 285/222.5; 285/290.4
(58) Field of Search .................. 285/222.1, 222.2, 285/222.3, 222.4, 222.5, 290.4, 242

(56) References Cited

U.S. PATENT DOCUMENTS

| | | | |
|---|---|---|---|
| 2,473,441 A | * 6/1949 | Muller | 285/222.2 |
| 2,915,323 A | * 12/1959 | Cullen et al. | 285/222.5 |
| 3,004,779 A | * 10/1961 | Cullen et al. | 285/222.5 |
| 3,120,401 A | * 2/1964 | Brown | 285/222.4 |
| 3,660,887 A | 5/1972 | Davis | |
| 3,672,712 A | 6/1972 | Davis | |
| 4,033,612 A | * 7/1977 | Chevalier | 285/222.4 |
| 4,126,157 A | 11/1978 | Roest | |
| 4,180,103 A | 12/1979 | Mollere | |
| 4,256,412 A | * 3/1981 | Tybus et al. | 403/267 |
| 4,396,213 A | * 8/1983 | Hawkins | 285/289.3 |
| 4,467,836 A | * 8/1984 | Ragout | 138/93 |
| 4,895,185 A | 1/1990 | Champleboux et al. | |
| 4,950,001 A | * 8/1990 | Briggs | 285/149 |
| 5,332,049 A | * 7/1994 | Tew | 175/320 |
| 5,443,099 A | * 8/1995 | Chaussepied et al. | 138/109 |
| 5,574,819 A | 11/1996 | Gunther et al. | |
| 6,283,206 B1 | * 9/2001 | Fraser et al. | 166/242.3 |

FOREIGN PATENT DOCUMENTS

| | | |
|---|---|---|
| DE | 195 29 273 | 2/1997 |
| GB | 2 279 085 | 12/1994 |
| NO | 176368 | 12/1994 |
| WO | WO94/18585 | 8/1994 |

* cited by examiner

Primary Examiner—David Bagnell
Assistant Examiner—Giovanna M Collins
(74) Attorney, Agent, or Firm—Merchant & Gould P.C.

(57) ABSTRACT

In a method of securing tensile reinforcement elements (7) of a pipeline or a cable to an end termination (18), the end termination is provided with a plurality of locking holes through which the reinforcement elements to be secured are pulled. Insertion of a spreader element into the reinforcement element results in a local cross-sectional increase in the tensile reinforcement. The reinforcement element cannot move freely through the locking hole because of the local cross-sectional increase, thereby achieving mechanical locking.

21 Claims, 6 Drawing Sheets

Figure 1:
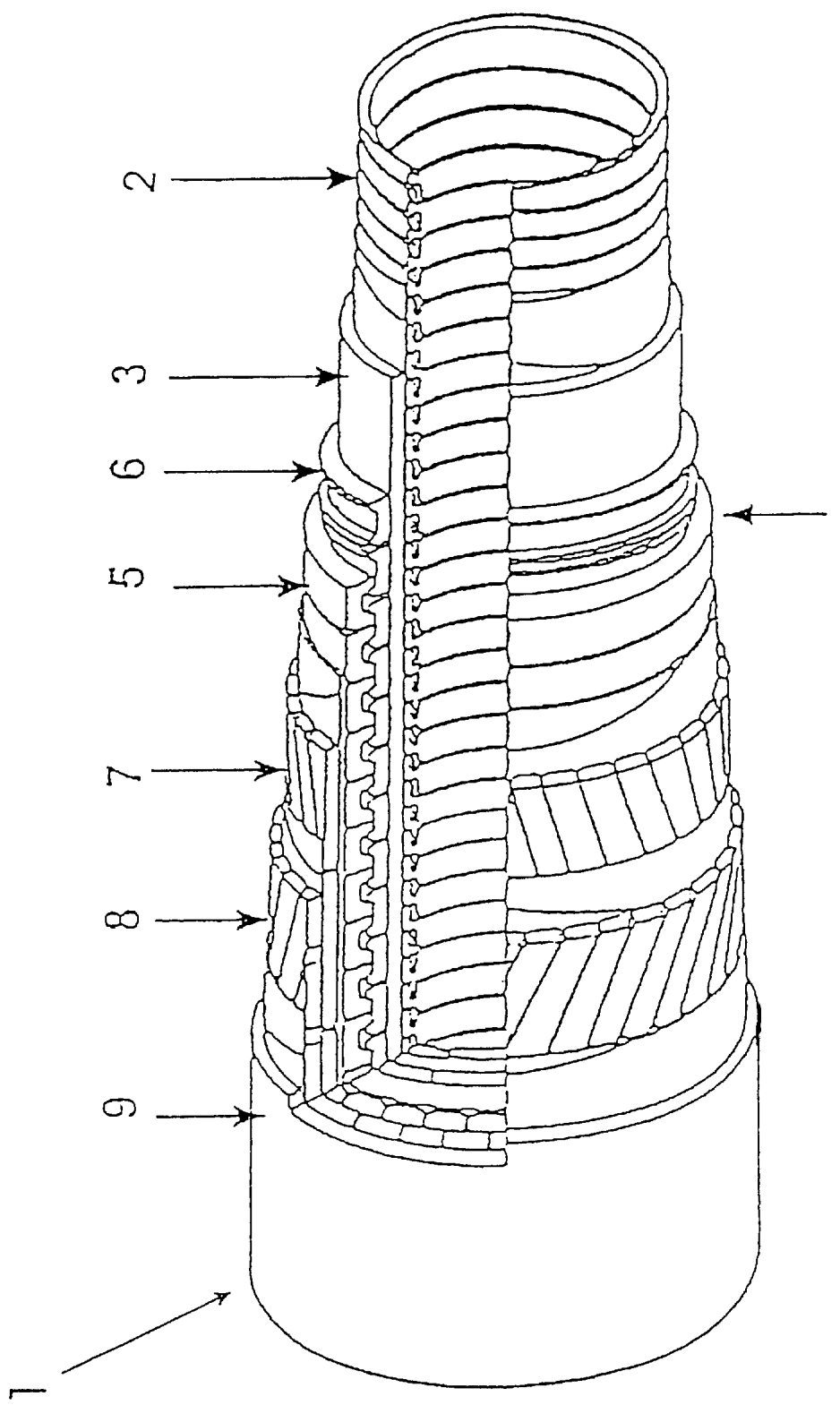

METHOD OF SECURING REINFORCEMENT WIRES TO AN END TERMINATION OF A PIPELINE OR A CABLE, AN END TERMINATION, AND USES OF THE METHOD AND THE END TERMINATION

The invention relates to a termination for securing reinforcement elements from a pipeline or a cable to an end termination.

The invention moreover relates to a use of the end termination.

Usually, flexible reinforced pipes, here called pipelines, of the above-mentioned type comprise an inner liner which forms a barrier to the outflow of the fluid that is transported through the pipe.

The inner liner is wound with one or more reinforcement layers which are not chemically bonded to the inner liner, but can move relatively to it, which ensures the flexibility of the pipeline during laying and in operation.

Externally on the reinforcement layers there is provided an outer sheath with a view to forming a barrier to the inflow of fluids from the surroundings of the pipeline to the reinforcement layers. To prevent collapse of the inner liner, it is frequently lined with a flexible, wound pipe, a so-called carcass.

The above-mentioned type of flexible pipelines is used inter alia for transporting liquids and gases at different water depths.

In particular, they are used in situations where very great or varying water pressures prevail along the longitudinal axis of the pipe. By way of example, mention may be made of riser pipes which extend from the sea bed and up to an installation at or near the surface of the sea.

Additionally, this type of pipelines is used inter alia between installations which are placed on the sea bed at a great depth, or between installations near the surface of the sea.

Some of the reinforcement layers, more particularly those which are used as compressive reinforcement, are frequently constructed such that they comprise profiles of metal. These profiles, when wound at a great angle relative to the longitudinal axis of the pipe, will be capable of absorbing radial compressive or tensile stresses that occur because of external or internal pressures in the pipeline. The profiles thus prevent collapse or bursting of the pipeline because of pressure impacts, and are therefore called compressive reinforcement elements.

In contrast, profiles wound at a small angle relative to the longitudinal axis of the pipeline, will not be capable of absorbing radial forces of importance, but will be capable of absorbing forces acting along the longitudinal axis of the pipeline. Profiles absorbing forces along the longitudinal axis of the pipeline are made of steel in conventional pipes. If they are made of a fibre-reinforced material, it is possible for the profiles to be composed of a reinforcement element or a plurality of reinforcement elements which are combined to a profile.

Below, the term tensile reinforcement elements will be used for the smallest, homogeneous, macroscopic, load-carrying part of a profile. Thus, a conventional profile will consist precisely of a tensile reinforcement element made of steel. Other more atypical profiles may be composed of a tensile reinforcement element or of a larger number of tensile reinforcement elements which are e.g. kept together as a unit by a polymer matrix.

A problem associated with the use of tensile reinforcement elements is that these must be secured at the ends of the pipeline, more particularly at the end terminations of the pipeline.

According to traditional methods, where the tensile reinforcement elements are made of steel, this attachment is provided by welding the individual reinforcement elements to the end termination.

WO 94/18585 A1 discloses a method of securing a signal-carrying cable to an end termination, said cable being surrounded by one or more tensile reinforcement elements. These elements are moreover surrounded by a cable sheath. The end termination consists of a housing which is characterized in that a locking through hole is provided in it.

Mechanical locking of the cable to the end termination is provided in that a tubular spreader element is moved down around the signal-carrying part of the cable, so that the tensile reinforcement elements and the cable sheath are pressed against the inner side of the locking hole, which results in mechanical locking of reinforcement elements and cable sheath. Subsequently, the remaining free volume is filled with a curing mass, typically thermosetting-plastics. A tensile relief is built in this manner, which operates without a critical mechanical load being applied to the signal-carrying cable.

Now, the object of the present invention is to provide a termination for individually securing relief reinforcement elements, made of an anisotropic, fibre-reinforced material, to an end termination, providing a much stronger attachment than known before.

The object of the invention is achieved in that the end termination is provided with a plurality of locking holes in which the tensile reinforcement elements are locked.

The individual locking holes are characterized in that the locking holes are separately formed by a single hole with the same or a varying diameter.

It is an advantage if the locking holes separately consist of at least two cylindrical hole sections, where at least one hole section has a larger diameter than another hole section, as the tensile reinforcement elements can hereby be fixed easily.

Expediently, the locking is carried out in that the locking takes place by means of a local cross-sectional increase of the tensile reinforcement elements, which can be performed easily by providing the cross-sectional increase by insertion of a spreader element in to the tensile reinforcement elements.

To increase the strength of the attachment additionally, it is an advantage if the locking hole is filled with a curing mass. This provides the advantage that the locking hole with spreader element and curing mass is particularly suitable as a tension-absorbing unit having a great tension-absorbing capacity.

To improve the production-technical conditions additionally, it is an advantage if the cross-sectional increase is provided in a part of the locking hole which does not have the smallest cross-sectional area.

For some production-technical conditions it may also be an advantage that the cross-sectional increase in the tensile reinforcement element is provided outside the locking hole by means of the spreader element.

In other conditions, it will be more expedient if the cross-sectional increase of the tensile reinforcement element is provided in the locking hole more particularly by mounting in the locking hole a collar of a metal having a ductility that allows deformation of it during assembly and in use of the tensile reinforcement element.

To minimize local mechanical impacts on the reinforcement element where this is in mechanical contact with the locking holes, the collar may be made of a ductile material. If the ductile collar is loaded beyond its yield point, it will be deformed, resulting in a larger engagement face between locking hole and reinforcement element.

Expediently, the locking holes are formed such that the locking holes are positioned in circular arcs which are equidistant relative to the axis of rotational symmetry of the end termination.

Preferably, the spreader element is wedge-shaped. The wedge shape ensures that the tensile reinforcement element in the tension relief is not damaged during assembly and in operation because of too great, local, mechanical stress concentrations.

The invented method and end termination differ from the art of the above-mentioned WO 94/18585 A1 in that according to the WO publication precisely one spreader element is used for securing all reinforcement elements, whereas more spreader elements are used according to the invention.

The invented method and end termination moreover differ from WO 94/18585 A1 in that the locking is provided by a local increase in the cross-sectional area of the individual reinforcement elements.

Expedient embodiments of the end termination are also defined.

As mentioned, the invention also relates to uses of the method and the end termination.

These uses are defined in claims 18 and 19.

It is noted that precisely in connection with pipelines for the transport of fluids it is of utmost importance that the mechanical structure is extremely reliable, since the impacts on such pipelines may be very great. Especially for environmental reasons, leakages because of ruptures of such pipelines cannot be tolerated.

Figure 2:
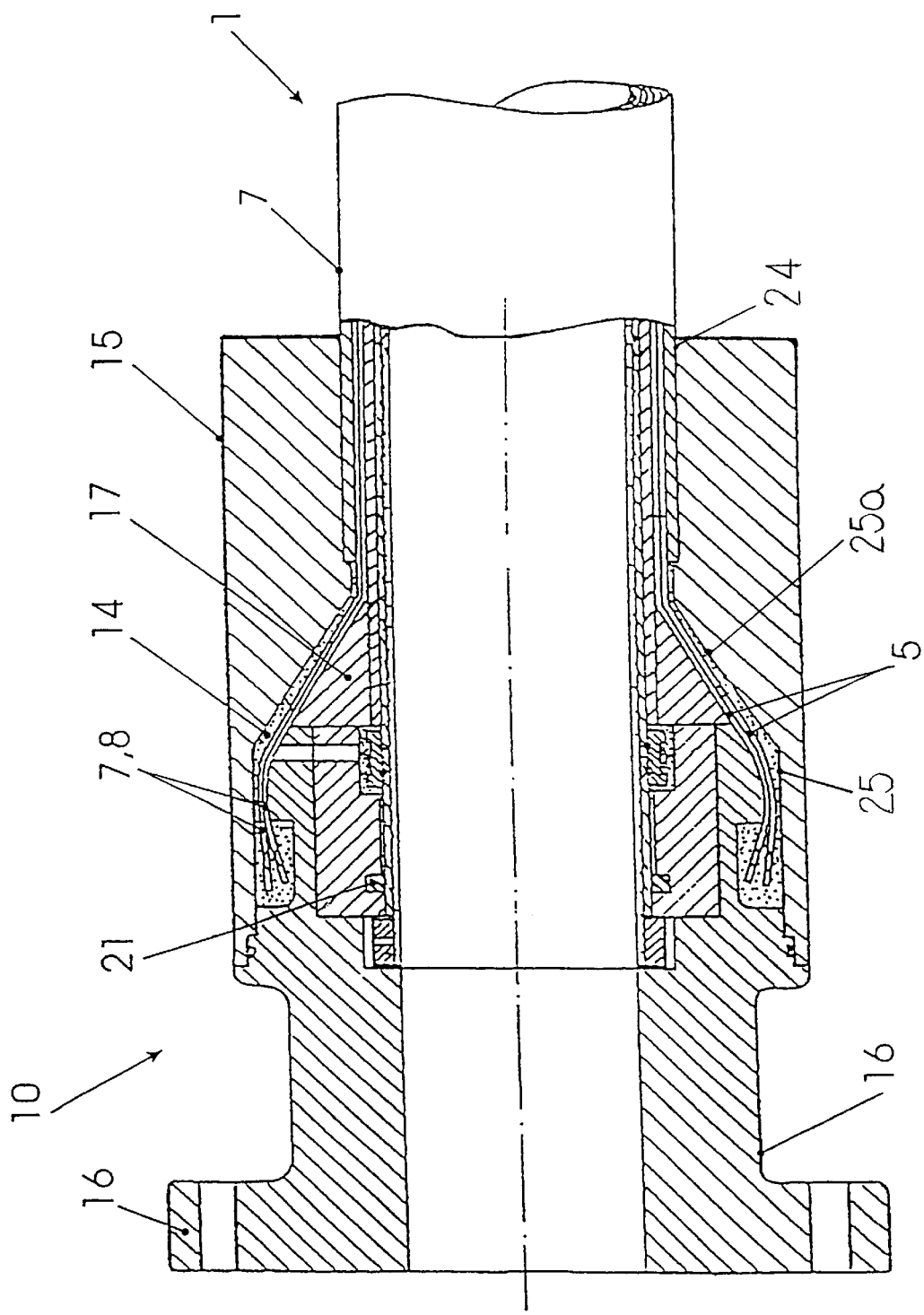
Figure 3:
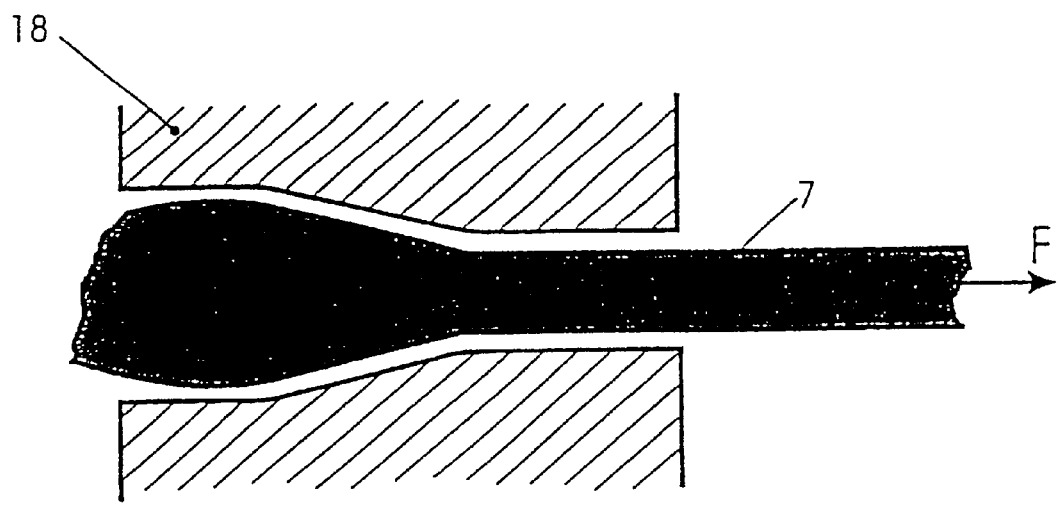
Figure 4:
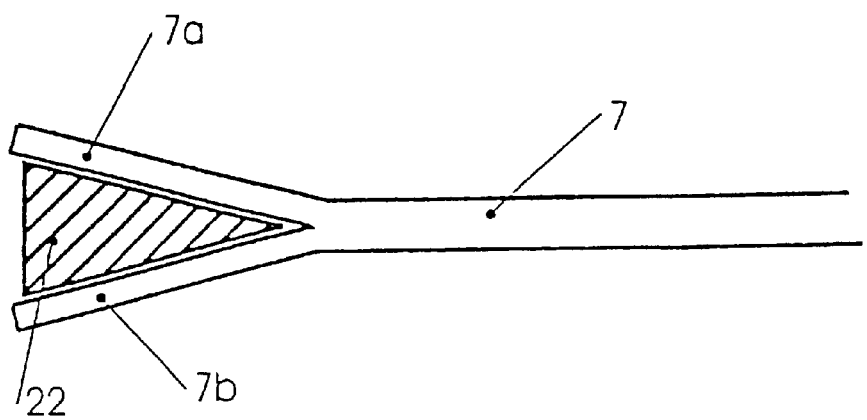
Figure 5:
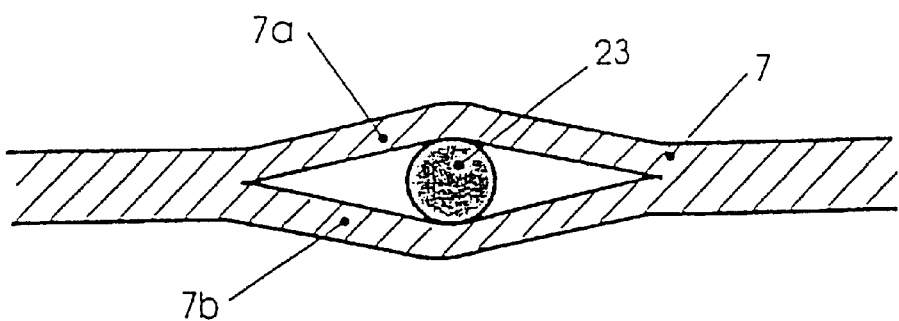
Figure 6:
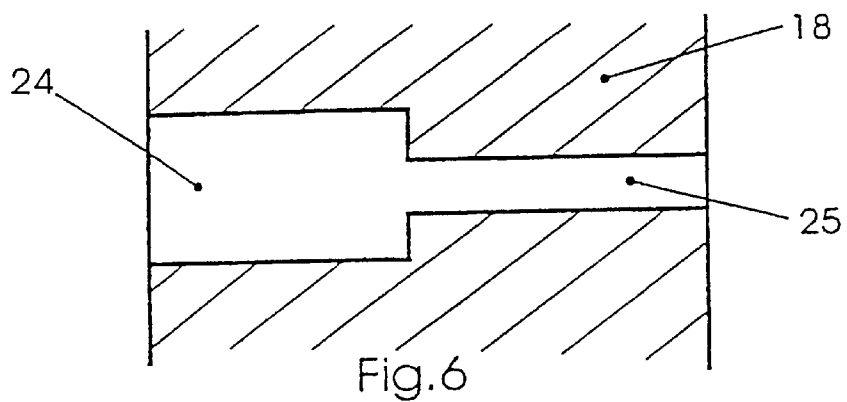
Figure 7:
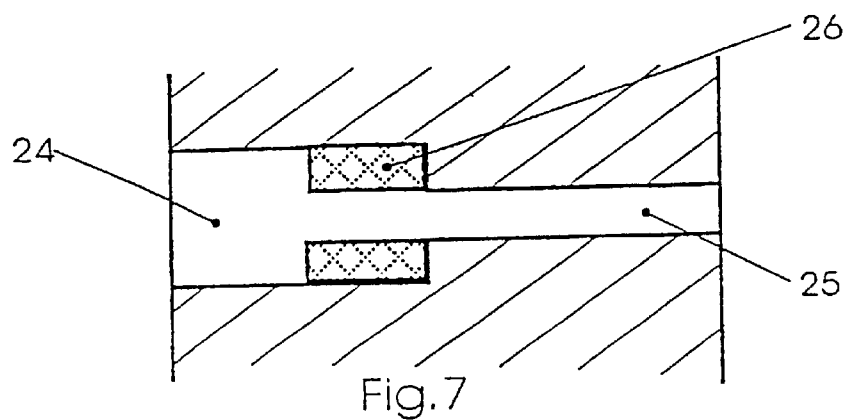
Figure 8:
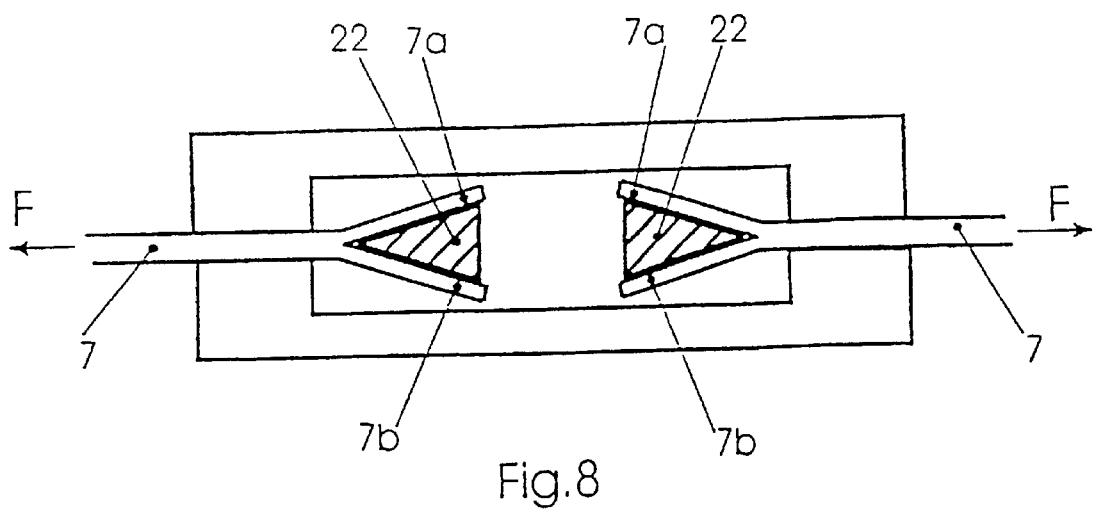
Figure 9:
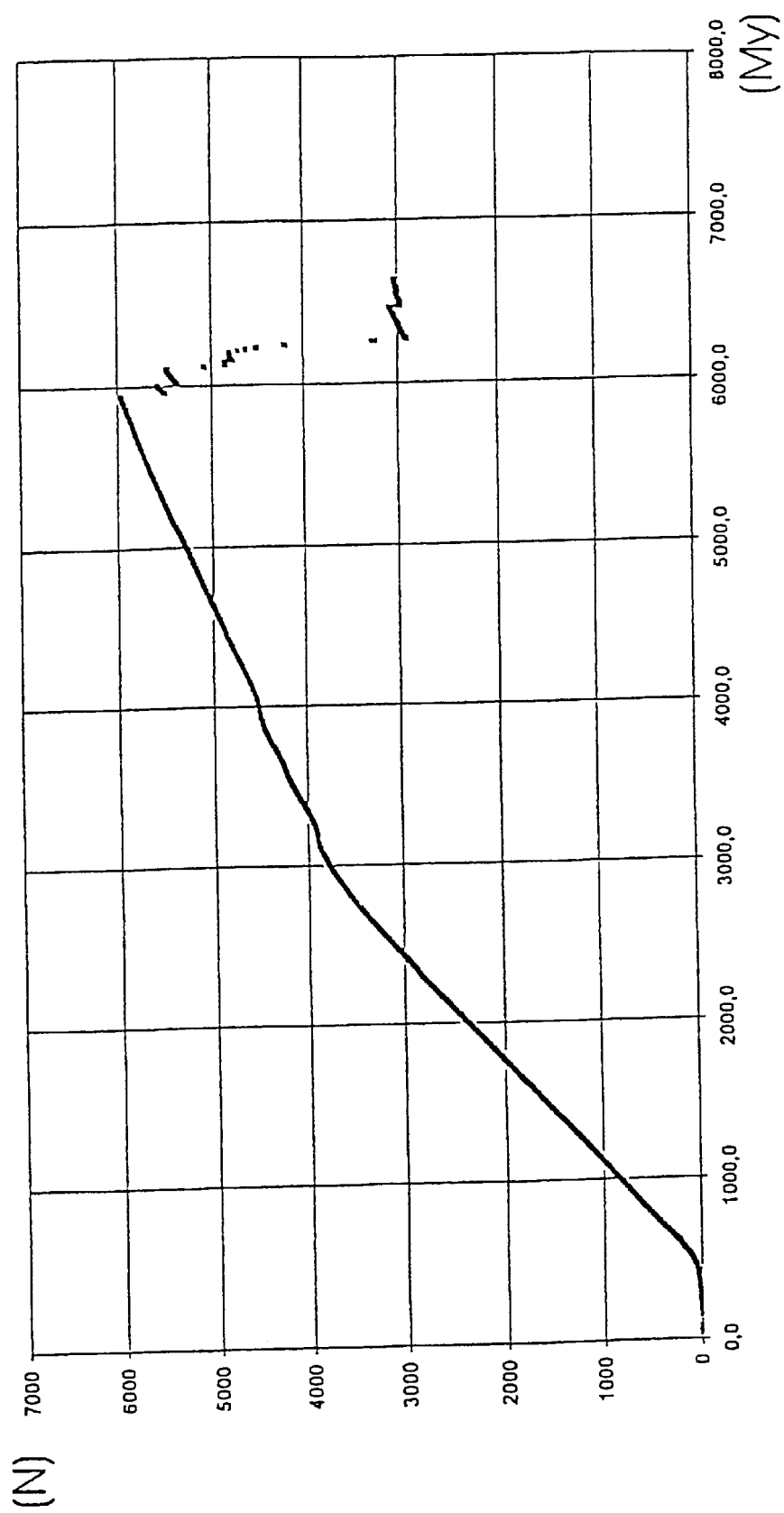
Figure 10:
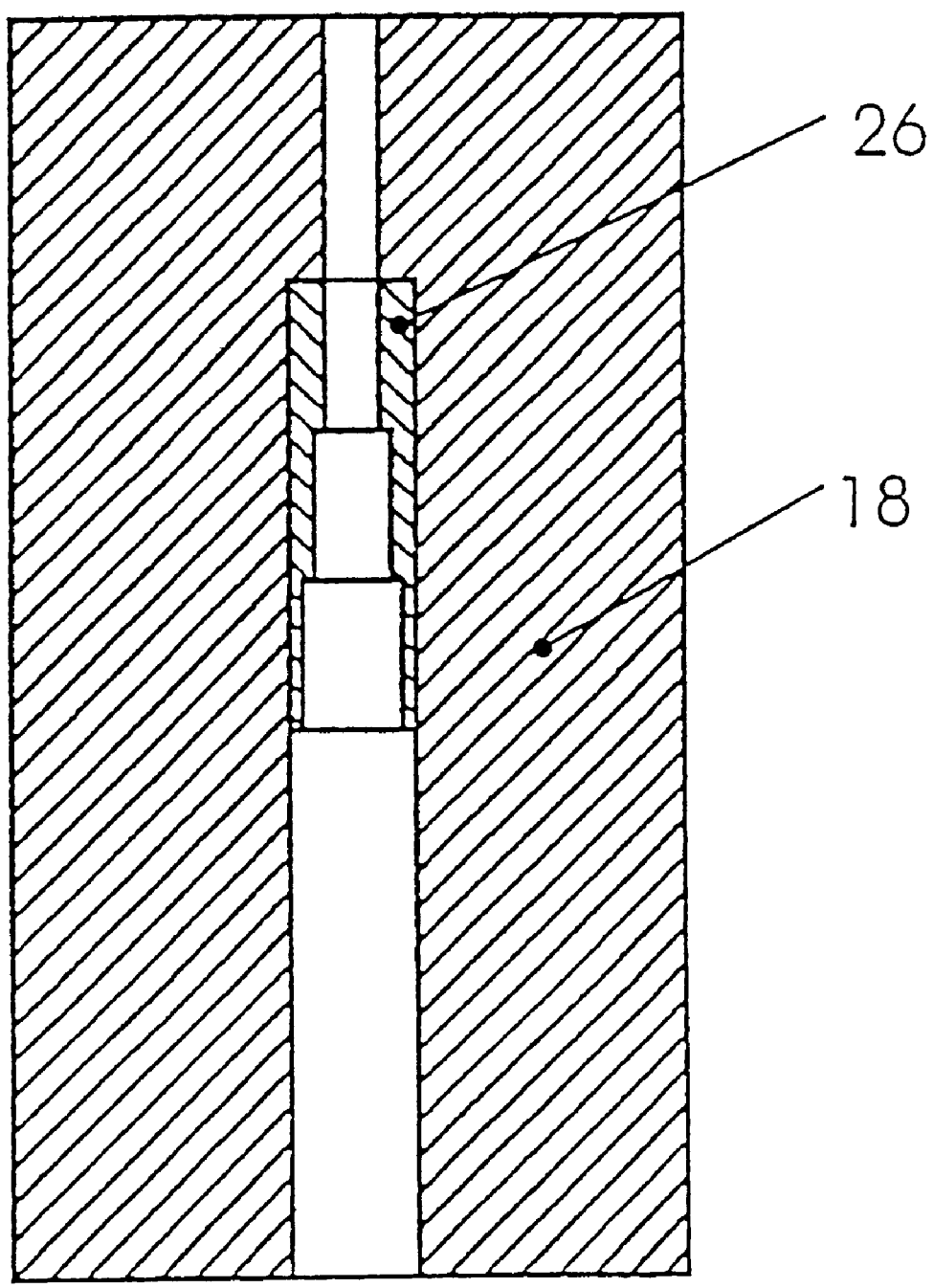

The invention will now be explained more fully with reference to the drawing, in which:

FIG. 1 shows an ordinary structure of a flexible reinforced pipeline with its different layers, FIG. 2 shows an ordinary structure of an end termination for the mounting of a flexible pipe where the tensile reinforcement is made of steel, FIG. 3 illustrates the basic mechanism of locking because of an expansion of the reinforcement element, FIGS. 4 and 5 show examples of how an increase in the cross-sectional area of the reinforcement element may be provided, FIGS. 6 and 7 show examples of how the locking hole, in which the locking takes place, may be formed, FIG. 8 shows how two reinforcement elements may be locked relatively to each other by the use of the principles of the invention, FIG. 9 shows the result of a laboratory test where a 200 mm long carbon/epoxy reinforcement element with a diameter of 2 mm has been loaded until rupture, while FIG. 10 shows an embodiment of the tension relief according to the invention which was used for generating the curve in FIG. 9.

FIG. 1 shows a pipeline which consists of an inner liner 3 surrounding a carcass which is formed by a helically wound metal tape 2 that forms an inner pipe. The metal tape 2 is formed with flaps in the manufacture which engage each other so as to lock the individual turns of the metal tape 2 to each other in such a manner that the carcass 1 can be bent in its longitudinal direction. Since the inner carcass 1 per se is not tight, the surrounding inner liner 3 serves the purpose of preventing flow of fluids to or from the interior of the pipe.

One or more layers of profiles 5, 6 are helically wound externally on the inner liner 3, said profiles forming turns of a great angle relative to the longitudinal direction of the pipe. Because of the great angle the profiles will primarily be capable of absorbing radial forces that occur because of internal or external pressures. The internal pressures occur in the operation of the pipe. The external pressures are caused partly by the hydrostatic pressure of the surroundings and partly by mechanical impacts during the laying of the pipe.

The turns thus form a compressive reinforcement which prevents the inner liner 3 from bursting because of a high pressure on the inner side of the pipeline, or from collapsing because of a high pressure on the outer side of the pipeline.

It is additionally shown in FIG. 1 that the compressive reinforcement has externally applied thereto a tensile reinforcement, which consists of one or more layers 7, 8 which are helically wound. The tensile reinforcement layers may include a material such as a unidirectional carbon fibre-reinforced composite material.

An intermediate jacket may be interposed between the compressive reinforcement and the tensile reinforcement, serving the purpose of preventing fluids from migrating between the compressive reinforcement and the tensile reinforcement.

These layers may finally be surrounded by an outer sheath 9.

The tensile reinforcement is usually composed of two helically wound layers of steel profiles with opposite winding direction.

In conventional pipe systems, the tensile reinforcement is secured to the end termination by welding.

FIG. 2 shows how a pipe of FIG. 1 may be connected to an end termination. The end termination in FIG. 2 consists of a first part 16 with a connecting flange 16, a second part 15 and a third part 17. First part 16 includes two holes 24, 25 extending in succession of each other. The holes 24, 25 may include a varying dimension axially along the length of the hole, such as the ramped surface 25a. The first, second and third parts 16, 15, 17 may include material such as steel, or a metal alloy which contains at least fifty percent Fe. Thus, the locking holes 24, 25 may be drilled in first part 16.

These three parts define a space 14 which accommodates a curing mass, such as an epoxy resin which surrounds tensile reinforcement wires 7, 8.

As will be seen in FIG. 3, a tensile reinforcement element, which has a thickening, will be capable of providing locking in a hole. Thus, an increase in the area of the tensile reinforcement element will ensure locking, even if the material distribution of the object perpendicular to the tensile reinforcement is rearranged.

As will be seen in FIG. 3, a locking hole is formed in a material 18 through which a reinforcement element 7 with a thickening at the end has been pulled. F indicates the direction of the force which the reinforcement element substantially absorbs.

According to the invention, in a first embodiment as shown in FIG. 4, the attachment is achieved in that the reinforcement wire extends through a locking hole at the end termination and then locally splits into two parts 7a and 7b between which a wedge 22 is inserted.

FIG. 5 shows a second method of providing a local increase in the cross-sectional area of a reinforcement element, as the reinforcement wire splits transversely to the longitudinal direction so that, also in this case, two parts 7a and 7a are provided, said parts defining a hole into which a foreign body 23, here shown with a round cross-section, may be inserted.

Of course, other methods than those described here may be used for a local increase in the cross-sectional area of the reinforcement wires.

FIGS. 6 and 7 show different shapes of locking holes.

In FIG. 6, the desired locking is provided by drilling two holes 24, 25 extending in succession of each other. If this method is used, the excess cavity may advantageously be filled with a curing mass, which will reduce the notch effect caused by the inner edge in the locking hole.

In FIG. 7, line in FIG. 6, two holes 24, 25 extending in succession of each other are used. The embodiment in FIG. 7 differs from the one in FIG. 6 in that a collar 26 of a ductile material is mounted internally. This collar will now be deformed by pulling of the object and assume a shape which will reduce the risk of rupture of the reinforcement element because of notch effects near the transition between the two hole sections. The collar 26 may be made of Cu or Ag or an alloy which contains at least fifty percent of these metals.

Of course, other shapes of locking holes than those described above may be used, if only the locking hole allows free passage of the unmodified reinforcement element, but prevents passage of the reinforcement element where an increase in area has been provided.

In certain conditions, in the general case, it will be an advantage to combine the mechanical locking with a gluing or moulding of another type that fills free volumes and results in a bond between the reinforcement element and the gluing.

FIG. 8 shows a method of splicing two parts of a reinforcement element. In principle, this embodiment corresponds to a combination of the embodiments shown in FIG. 4 and FIG. 6. Therefore, reference is made to the explanation of FIG. 4, as FIG. 8 is provided with the same reference numerals as FIG. 4.

FIG. 9 shows a tensile test performed on a rod (not shown) with a length of 200 mm and a diameter of 2 mm, which has been inserted into the steel block 18 shown in FIG. 10.

The steel block 18 is generally constructed in a similar manner to the one shown in FIG. 7, but the collar 26 here has inner step-shaped sections, three sections being shown, e.g. of copper. The free volume is filled with a glue after the insertion of the rod.

It should be noted, as shown in FIG. 9, that the tension achieved in the material before rupture is about 2.3 GPa, which corresponds to the theoretical strength of the rod.

It should additionally be noted that the recorded modulus of elasticity is much lower than the real modulus of elasticity of a typical carbon composite. The reason is that the copper collar has yielded near the inner edges as the tensile force has been increased. This yield of the inner edges has smoothed local stress concentrations, and therefore critical notch effect at the contact points has been avoided.

Clearly, the present invention may be performed in other ways than those shown above within the scope of the claims.

Thus, there is great freedom in applying the principles of the invention in connection with pipes where several of these are combined by means of coupling elements, etc.

Also, the invention may advantageously be used for securing longitudinal reinforcement wires in cables which are basically constructed as pipes without a compressive reinforcement, the inner cavity being replaced by a conducting element.

What is claimed is:

1. A termination in combination with tensile reinforcement elements of a cable or a pipeline,
   wherein said termination is provided with a plurality of locking holes in which the tensile reinforcement elements are locked be means of a local cross-sectional increase of the tensile reinforcement elements,
   at least one of said locking holes being formed by a single hole with at least two hole sections, and
   a first hole section of the at least two hole sections has a larger diameter than a second hole section of the at least two hole sections.

2. A termination in combination with tensile reinforcement elements according to claim 1 wherein said cross-sectional increase is provided by insertion of a spreader element into the tensile reinforcement elements.

3. A termination in combination with tensile reinforcement elements according to claim 2 wherein the spreader element is wedge-shaped.

4. A termination in combination with tensile reinforcement elements according to claim 2 wherein the spreader element is glued to the tensile reinforcement element.

5. A termination in combination with tensile reinforcement elements according to claim 2 wherein the tensile reinforcement element comprises a fibre-reinforced material.

6. A termination in combination with tensile reinforcement elements according to claim 2 wherein the fibre-reinforced material is a unidirectional carbon fibre-reinforced composite material.

7. A termination in combination with tensile reinforcement elements according to claim 1 wherein said cross-sectional increase is provided in a part of the locking hole that does not have the smallest cross-sectional area.

8. A termination in combination with tensile reinforcement elements according to claim 1 wherein the remaining of the locking holes is filled with a curing mass.

9. A termination in combination with tensile reinforcement elements according to claim 1 wherein a collar of metal is mounted in the locking hole.

10. A termination in combination with tensile reinforcement elements according to claim 9 wherein said collar comprises a metal selected from the group consisting of Cu, Ag and alloys containing at least 50% of these metal.

11. A termination in combination with tensile reinforcement elements according to claim 9 wherein said collar is mounted in the first hole section.

12. A termination in combination with tensile reinforcement elements according to claim 9 wherein said collar comprises a material that is sufficiently ductile to reduce the contact pressure between the tensile reinforcement element and sides of the locking hole because of plastic deformation of the collar.

13. A termination in combination with tensile reinforcement elements according to claim 1 wherein said locking holes are drilled in a metal selected from the group consisting of steel and a metal alloy that contains at least 50% of Fe.

14. A termination in combination with tensile reinforcement elements of a cable or a pipeline, wherein said termination is provided with a plurality of locking holes in which the tensile reinforcement elements are locked, said tensile reinforcement elements being locked in the locking holes by means of a local cross-sectional increase of the respective tensile reinforcement elements.

15. A termination in combination with tensile reinforcement elements according to claim 14 wherein said cross-sectional increase is provided by insertion of a spreader element into the tensile reinforcement elements.

16. A termination in combination with tensile reinforcement elements according to claim 15 wherein the spreader element is wedge-shaped.

17. A termination in combination with tensile reinforcement elements according to claim 15 wherein the spreader element is glued to the tensile reinforcement element.

18. A termination in combination with tensile reinforcement elements according to claim 15 wherein the tensile reinforcement element comprises a fibre-reinforced material.

19. A termination in combination with tensile reinforcement elements according to claim 15 wherein the fibre-reinforced material is a unidirectional carbon fibre-reinforced composite material.

20. A termination in combination with tensile reinforcement elements according to claim 14 wherein the remaining of the locking holes is filled with a curing mass.

21. A termination in combination with tensile reinforcement elements according to claim 14 wherein said locking holes are drilled in a metal selected from the group consisting of steel and a metal alloy that contains at least 50% of Fe.

* * * * *